May 30, 1961     J. R. HUTCHISON     2,986,244

FASTENER SEALING DEVICE

Original Filed July 1, 1952

INVENTOR.
J.R. HUTCHISON
BY S. Tierney Jr.

United States Patent Office 2,986,244
Patented May 30, 1961

2,986,244

FASTENER SEALING DEVICE

James R. Hutchison, Imperial Beach, Calif., assignor to Rohr Aircraft Corporation, Chula Vista, Calif., a corporation of California Original application July 1, 1952, Ser. No. 296,679, now Patent No. 2,884,098, dated Apr. 28, 1959. Divided and this application Mar. 24, 1958, Ser. No. 723,462

10 Claims. (Cl. 189—36)

This invention relates to sealing devices, particularly to such sealing devices as are used to seal the rivets, bolts, screws or similar fasteners against the passage of liquids or gases when such fasteners are employed in the construction of tanks, pressure vessels or other liquid or air tight structures.

The primary object of the invention is to provide an effective means for hermetically sealing the fasteners used in the construction of tanks, pressure vessels and the like which will not impair or diminish the mechanical strength of the fastener when installed in the structure.

Another object is to provide a sealing device which will maintain its effective sealing qualities through a wide range of pressure and temperature changes.

A further object is to provide a sealing device which may be readily installed with all types of conventional fasteners and which will provide an effective seal for long periods of service.

Another object is to provide a sealing device which is simple and inexpensive to manufacture and easily assembled on a fastener.

A further object is to provide a sealing means which may be assembled on the fastener before the assembly of fastener and sealing means is inserted in the members to be secured together.

These and other objects will become apparent as the description of the device proceeds.

The satisfactory sealing of the fasteners used in the assembly of aircraft fuel tanks, pressurised cabins and the like, has become increasingly important and difficult with the development of aircraft which are capable of attaining extremely high speeds and very high altitudes. The severe stresses to which the airplane structure is subjected by these high speeds makes it important that the fasteners used in its construction maintain a high degree of mechanical strength. It is therefore important that the sealing devices used with these fasteners do not impair their mechanical strength and unduly weaken the structure. Laboratory tests have shown that my new sealing device substantially increases the shear values of the riveted joints in which they are installed providing a mechanically stronger structure and at the same time effectively sealing the rivets against leakage of liquids or gases.

Also the sealing devices commonly in use at the present time are designed primarily for installation under the head of the fastener making them difficult to use with a fastener whose head is required to be flush with the surface of the structure. My sealing device may be installed at either end of the fastener without affecting its strength or sealing efficiency, an important advantage in modern aircraft construction.

Due to the high altitudes at which modern airplanes operate, the sealing devices used to seal the fasteners are subjected to a wide range of temperatures and pressures. By the use of a resilient gasket compressed around the shank of the fastener and entirely enclosed within a rigid metal structure which protects the resilient seal as well as retaining it in a compressed state of sealing contact, the sealing properties of my device remain unaffected by changes in pressure or temperature. Also, by completely enclosing the gasket within a metal structure it is not subjected to the deleterious effects of changeable atmospheric conditions thereby greatly prolonging its service life.

Another feature of my invention is the ease with which it may be installed. No special tools are required in its installation and when used under the heads of the fasteners it is possible to assemble sealing devices on a number of the fasteners prior to their installation and insert them with the fastener in the members to be secured together, thus greatly reducing the time usually required to install sealing devices of this type.

My invention consists primarily of a resilient rubber-like toroidal gasket which is positioned around the shank of a fastener extending through a countersunk opening in one or more of the overlapping walls of a tank or similar structure. A rigid retainer having the shape of a truncated cone the peripheral wall of which is adapted to engage the wall of the countersunk opening and which has a central opening through which the shank of the fastener passes, is inserted into the countersunk opening over the gasket. When the fastener is tightened, the peripheral wall of the retainer is drawn into engagement with the wall of the countersunk opening and the gasket is compressed into sealing contact with the shank of the fastener and the surrounding adjacent parts of the structure, effectively sealing the joint against passage of liquids or gases.

For a better understanding of the invention reference is made to the accompanying drawing illustrating preferred embodiments in which similar numerals of designation refer to similar parts throughout the several views in which.

Figure 1:
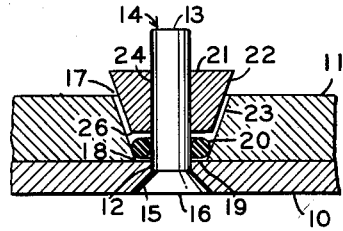
Figure 1 is a view in cross section of the sealing device in position on the shank of a rivet extending through the countersunk opening in the overlapping walls of a tank, prior to the securing of the rivet.
Figure 2:
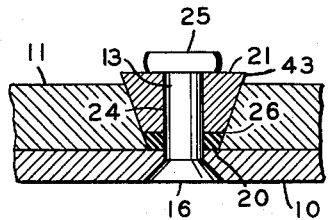
Figure 2 is a cross sectional view similar to Figure 1 in which the rivet has been secured, drawing the rigid retainer into engagement with the wall of the countersunk opening and compressing the resilient gasket into sealing contact with the shank of the fastener and the adjacent parts of the structure.

Referring to Figures 1 and 2, the invention is shown in connection with a tank wall composed of an outer metal sheet 10 and an overlapping inner sheet 11 joined together by a fastener. Sheet 10 is provided with a cylindrical opening 12 through which the shank 13 of a rivet 14 passes and which is countersunk at 15 to receive the tapered preformed head 16 of the rivet. Sheet 11 is provided with a countersunk opening 17 extending therethrough which is concentric with opening 12 and through which shank 13 extends. The inner or smaller end 18 of opening 17 is slightly larger than opening 12 thus exposing a small amount of the flat inner surface 19 of wall 10 around opening 12. A toroidal gasket 20, preferably of cylindrical cross section, composed of resilient rubber-like material having an opening through which shank 13 may freely pass, is positioned within opening 17 around shank 13. Gasket 20 may be made of natural or synthetic rubber, "neoprene" or any suitable resilient material which is insoluble in the fluid to be contained in the tank.

A rigid retainer 21 having the shape of a truncated cone, the peripheral wall 22 of which has the same taper as the wall 23 of opening 17 and which has a central opening 24 through which shank 13 extends, is inserted into opening 17. Retainer 21 is preferably made of metal which is harder than that used in the wall in which the retainer is seated. Upon driving the head 25 of the rivet, the retainer is drawn into opening 17 and sheets 10 and 11 drawn and riveted together. Simultaneously gasket 20 is deformed and compressed into sealing contact with shank 13, wall surface 19, wall 23 and the lower end face 26 of retainer 21, completely filling the space beneath end 26 as shown in Figure 2, thus sealing the riveted joint. As may be observed, the resilient gasket is entirely contained within the structure in a position so that, in its compressed state, it effectively seals the joint against any leakage of the contents of the tank along the fastener or along the abutting faces of sheets 10 and 11. Also to be noted is the rigid installation of the rivet obtained through the use of the tapered retainer 21 seated in the countersunk opening 17 which provides a full metal to metal connection between sheet 11 and rivet 14, the pressure of the tightened rivet being transmitted to sheet 11 by retainer 21. As may be seen, the fastener installed with my sealing deivce is as permanently rigid as one installed in a conventional manner without any sealing device. It will also be noted that any shear load applied to sheet 11 due to the flexing of a tank mounted on an airplane is transmitted by retainer 21 directly to the shank 13 of the rivet.

Figures 4, 5, 6:
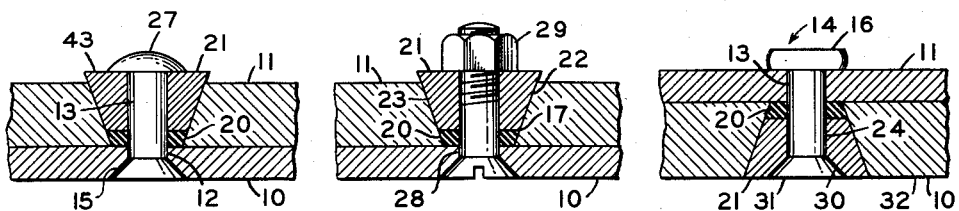
Figure 4 is a cross sectional view of a rivet securing the overlapping sheets forming the wall of a tank together in which the sealing device is shown under the head of the rivet and the expanded end of the rivet driven flush with the outer surface of the tank wall.
Figure 5 is a view in cross section of the overlapping members of a tank wall secured together by a machine screw and nut, the sealing device being drawn into sealing engagement by the nut.
Figure 6 is a cross sectional view of the overlapping members of a tank secured together by a rivet provided with a sealing device disposed in the outer wall of the tank.

My sealing device may be installed with various types of conventional fasteners as illustrated in the drawing. In Figure 4 is illustrated a sealing device with the rigid retainer 21 in position under the preformed head 27 of a round head rivet the shank 13 of which is driven and expanded into the countersunk portion 15 of opening 12, to draw sheets 10 and 11 together, deform gasket 20 and seal the joint. If a number of rivets of this type are to be driven, a retainer and gasket may be put on the shank of each rivet before any of the rivets are driven, thus saving the time of the rivet driver and speeding up the riveting operation.

Figure 5 of the drawing shows a machine screw 28 and nut 29 used to secure sheets 10 and 11 together, the gasket 20 and rigid retainer 21 being drawn into position under nut 29. In tightening this type fastener I have found it advisable to hold nut 29 in a stationary position and rotate screw 26 to avoid rotation of retainer 21 which might result in damage to walls 22 and 23 or to gasket 20.

In Figure 6 a rivet 14 having a flat preformed head 16 is shown equipped with a sealing device in which the opening 24 passing through retainer 21 is countersunk as at 30 to receive the expanded end 31 of shank 13 when the rivet is driven. The expanded end 31 and the exposed end of retainer 21 may be machined flush with the outer surface 32 of wall 10 to provide a smooth unobstructed surface in event these parts protrude slightly after the rivet head is driven. In an airplane installation where surface 32 is exposed to the airstream, this construction minimizes friction.

Figure 7:
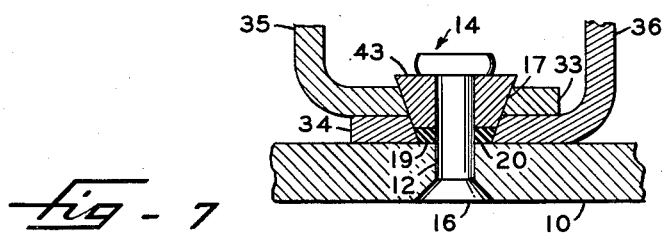
Figure 7 is a view in cross section showing the invention applied to a tank wall having the overlapping ends of a pair of interior tank braces attached to it. This application is a division of my application Serial No. 296,679 filed July 1, 1952, and now Patent #2,884,098.

My sealing device may also be installed on a rivet or other fastener which joins together more than two sheets of material. This is illustrated in Figure 7 in which the overlapping ends 33 and 34 of a pair of interior tank braces 35 and 36 are riveted to wall 10 of the tank. The countersunk opening 17 is extended through both ends 33, 34 and gasket 20 is pressed against the inner face of sheet 10. As may be seen, any liquid or gas passing through the joints between end 33 and end 34 or between 34 and the inner surface of sheet 10 will be effectively sealed from passage through opening 12 in sheet 10 by compressed gasket 20.

Figure 3:
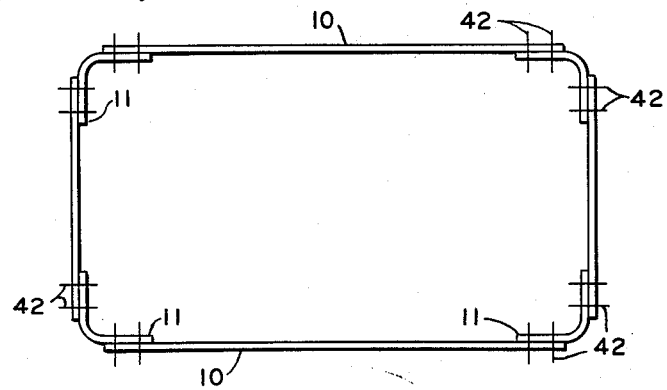
Figure 3 is a view in vertical cross section and partly diagrammatic of a tank, illustrating the manner in which the various sheets composing the structure are joined together by rows of riveted joints.

In Figure 3 of the drawing is illustrated the construction of a tank the walls of which are composed of the overlapping sheets 10 and 11 joined together by a riveted joint formed by two rows of spaced apart fasteners, each row represented by a line 42. The fasteners used may be any of the sealed types illustrated in Figures 1 and 2 or Figures 4 through 7.

In manufacturing the sealing device I prefer, as before mentioned, to make the rigid retainer 21 of a material substantially harder than the material of which the tank wall in which it is seated is made. The peripheral wall 22 of retainer 21 may be tapered to any desired degree; however, I have found that a retainer having a peripheral wall which tapers at a 40° angle is preferable. Also, I prefer to make retainer 21 of ample length permitting it to protrude above the inner surface of the tank as indicated at 43. This permits rivets of given size to be used in materials of various thicknesses and also compensates for the variations in thickness of standard sheet metals due to manufacturing tolerances. It is preferable that the opening in gasket 20 be sufficiently large to permit the shank of the fastener to just pass through it freely to facilitate the passage of the gasket along the shank and to avoid damage to the gasket when it is compressed into sealing contact with the surrounding members.

To install the sealing device, I prefer to drill an opening through both sheets 10 and 11 of the size required to pass shank 13 of the fastener. I then countersink this opening through wall 11 to the same degree of taper as the taper of the peripheral wall 22 of retainer 21, thus forming countersunk opening 17 in which retainer 21 is to be seated. To ensure that opening 17 is concentric with cylindrical opening 12, I use a countersink having a pilot of the same diameter as shank 13, the pilot remaining in opening 12 during the countersinking operation. The countersink also has a small cutting surface at its smaller end at right angles to the axis of the pilot so that opening 17 is slightly larger in diameter at its small end 18 than the diameter of opening 12 to expose a small portion 19 of the flat inner surface of sheet 10 surrounding opening 12. It is important that the countersunk opening 17 extend completely through the sheet or sheets in which it is cut to allow gasket 20 to come in contact with the inner surface of the adjacent sheet so that the joint may be effectively sealed against leakage as above explained. A very slight extension of countersunk opening 17 into the inner surface of sheet 10 will not affect the sealing qualities of the fastener as such extension does not prevent gasket 20 from being deformed and compressed into sealing contact with shank 13 and the adjacent surfaces by the end 26 of retainer 21.

As may be seen, the manufacture and installation of my sealing device is inexpensive and simple and it provides an effective means for hermetically sealing various types of fasteners without impairment of their mechanical strength, making its use particularly advantageous in the construction of aircraft in which a great many sealing devices are used.

This invention may be embodied in other forms or carried out in other ways without departing from the spirit or essential characteristics thereof. The present embodiment of the invention is therefore to be considered in all respects as illustrative and not restrictive, the scope of the invention being indicated by the appended claims, and all changes coming within the meaning and range of equivalency of the claims are intended to be embraced therein.

Having thus described my invention, what I claim as new and useful and desire to secure by Letters Patent is:

1. A container wall comprising two overlapping rigid sheets having an opening extending therethrough, the opening in one sheet being cylindrical for a substantial distance from the abutting faces of the sheets and the opening in the other sheet having a frusto-conical marginal wall with a diameter at the abutting faces substantially greater than the diameter of said cylindrical opening whereby an annular flat portion of the inner surface of said one sheet surrounding said cylindrical opening therein is exposed within said opening in said other sheet; a fastener extending through said opening and having a cylindrical shank in engagement with the cylindrical portion of said opening; a rigid metal frusto-conical retainer seated against said marginal wall and having a hardness at least equal to the hardness of said sheets; a toroidal gasket of resilient material disposed against the small end of said retainer; and a head on one end of said fastener in engagement with said one sheet arranged to hold the sheets together and to bias the curved face of said retainer into contact with the marginal wall of said frusto-conical opening and to simultaneously deform said gasket into sealing contact with said marginal wall, the small end of said retainer and said annular flat portion of said one sheet, the entire pressure biasing said other sheet against said one sheet being applied to said tapered conical wall by said retainer.

2. A wall comprising inner and outer overlapping rigid metal sheets having an opening extending therethrough, the opening in the outer sheet having a cylindrical portion terminating at its outer end in a portion tapered at an angle of about 40 degrees and the opening in the inner sheet having a frusto-conical marginal wall extending through the inner sheet, said frusto-conical opening having a diameter at the outer face of the inner sheet substantially greater than the diameter of said cylindrical portion whereby an annular flat portion of the inner surface of said outer sheet surrounding said cylindrical opening therein is exposed within said opening in the inner sheet; a rivet extending through said opening in the sheets and having a cylindrical shank in contact with the marginal wall of said cylindrical portion throughout the entire length of said cylindrical portion, said rivet having a tapered head disposed in the tapered portion of the hole in the outer sheet; a rigid metal frusto-conical retainer seated against said wall of the opening in the inner sheet and having a hardness at least equal to the hardness of said inner sheet; a toroidal gasket of resilient material disposed against the small end of said retainer; and a circular driven head on the inner end of the rivet having a diameter substantially smaller than the diameter of the large end of said retainer, the driving of said circular head causing said retainer to press the inner sheet against the outer sheet and to deform said gasket into sealing contact with the shank of the rivet, the small end of said retainer, said frusto-conical wall in the inner sheet and said annular flat portion of the outer sheet.

3. A wall as claimed in claim 2, in which the hardness of said retainer is substantially greater than the hardness of said inner sheet.

4. A wall comprising inner and outer rigid overlapping sheets with the outer face of the inner sheet in contact with the inner face of the outer sheet to form a thickened wall portion, said thickened wall portion having an opening extending through both sheets, the opening in the outer sheet being cylindrical for a substantial distance outward from the abutting faces of the sheets and the opening in the inner sheet having a frusto-conical marginal wall with a diameter at the abutting faces of the sheets substantially greater than the diameter of said cylindrical opening whereby an annular portion of said outer sheet surrounding said cylindrical opening therein is exposed within said opening in the inner sheet; a headed fastener extending through said opening in both sheets and having a smooth cylindrical shank in engagement with the cylindrical portion of said opening; a rigid hollow frusto-conical retainer surrounding said shank and seated against said marginal wall, said retainer having a hardness greater than that of said inner sheet; a toroidal gasket of resilient material surrounding said fastener shank and in contact with the small end of said retainer; and a head on said fastener in engagement with the large end of said retainer arranged to press the curved face of the retainer against said frusto-conical wall and to deform said gasket into sealing contact with said frusto-conical wall, the shank of the fastener, the small end of the retainer and said annular portion of said outer sheet, the entire pressure biasing said inner sheet against said outer sheet being applied to said tapered conical wall by said retainer.

5. In a laminated structure composed of a plurality of laminations of sheet metal, the outer lamination being provided with an opening adapted to pass the shank of a fastener, the remaining lamination or laminations having a counter-sunk opening extending therethrough and through which the shank of the fastener passes, and a fastener having a cylindrically shaped shank passing through said opening and holding said laminations in close abutting relationship; means for hermetically sealing said fastener comprising in combination: a retainer of rigid material in the shape of a truncated cone the peripheral wall of which is adapted to engage the marginal wall of said counter-sunk opening, said retainer being provided with a central opening adapted to pass the fastener shank; a toroidal shaped gasket of resilient rubber-like material disposed within said countersunk opening and surrounding the fastener shank, said gasket being deformed into sealing contact with the adjacent surfaces of said fastener shank, said countersunk and said retainer, upon tightening of said fastener.

6. In a laminated structure composed of laminations of sheet metal, the outer lamination being provided with an opening adapted to pass the shank of a fastener, the remaining lamination or laminations having a countersunk opening extending therethrough and through which the shank of the fastener passes, and a fastener having a tapered head and a smooth cylindrical shank passing through said opening and holding said laminations in close abutting relationship; means for hermetically sealing said fastener comprising in combination: a retainer of rigid material in the shape of a truncated cone the peripheral wall of which engages the marginal wall of said countersunk opening, said retainer being provided with a central opening, the inner portion of which is cylindrical to pass the shank of the fastener and the outer end of which has a tapered marginal wall against which the tapered head of the fastener is seated; a toroidal shaped gasket of resilient rubber-like material disposed within said countersunk opening and surrounding the fastener shank, said gasket being deformed into sealing contact with the adjacent surfaces of the fastener shank, said countersunk and the small end of said retainer, upon tightening of the fastener.

7. A laminated structure comprising a metallic fastener having a cylindrical shank; a rigid frusto-conical retainer having a central opening through which said shank passes; a toroidal gasket of resilient material disposed around said shank and in contact with the small end of said retainer; at least two overlapping sheets of rigid material, said sheets having an opening through which said fastener passes, one portion of said opening being cylindrical and in contact with said shank and another portion thereof comprising a conical marginal wall having the same taper as said retainer and in contact with said retainer; means on opposite ends of said shank respectively engaging one of said sheets and the large end of said retainer for compressing said sheets together and seating said retainer in said conical marginal wall; said gasket being deformed into sealing contact with said conical marginal wall, the shank, and the inner end of said frusto-conical retainer upon said seating of the retainer in the conical wall.

8. A laminated structure comprising a metallic rivet having a cylindrical shank terminating at one end in a preformed frusto-conical head; a rigid frusto-conical retainer having a central opening through which said shank passes; a toroidal gasket of resilient material disposed around said shank and in contact with the small end of said retainer; at least two overlapping sheets or rigid material, said sheets having an opening through which said rivet passes, said opening having a tapered portion for seating said frusto-conical head therein, an intermediate cylindrical portion for receiving said shank, and a conical marginal wall having the same taper as said retainer and in contact with said retainer; a driven head at the other end of said shank, said sheets being compressed together and said gasket being deformed into sealing contact with said conical marginal wall, the shank, and the inner end of said frusto-conical retainer upon the driving of said driven head.

9. Means for sealing the riveted joint between abutting metal sheets having a hole therethrough, said hole having a cylindrical portion and first and second conical marginal wall portions which taper outwardly and respectively terminate in the outer faces of said sheets, a rivet having a cylindrical shank extending through said cylindrical hole portion and terminating in a preformed head having the shape of a conical frustum tapered to correspond with the first of said tapered marginal wall portions; a rigid retainer having the shape of a conical frustum tapered to correspond with the second of said tapered marginal wall portions and having a cylindrical central opening for passing said rivet shank therethrough; and a rubber-like toroidal ring disposed against said shank and the inner end of said retainer, the other end of said shank being upset to form a second rivet head, said retainer and said preformed rivet head being seated in their respective marginal wall portions, said sheets being pressed into firm abutting contact with each other, and said ring being deformed into sealing contact with the inner end of said retainer, said second tapered marginal wall portion and the shank of said rivet upon the forming of said second rivet head.

10. In a laminated structure composed of abutting sheets of metal having an opening therethrough including a cylindrical portion and a countersunk portion in the outer face of one of said sheets, and a headed fastener having a cylindrical shank passing through said opening in conformity with said cylindrical portion and having tightening means at the other end thereof for compressing said sheets in close abutting relationship; means for hermetically sealing said fastener comprising in combination: a retainer of rigid material in the shape of a truncated cone the peripheral wall of which is adapted to engage the marginal wall of said countersunk opening portion and the large end of which is engageable by the head of said fastener or selectively by said tightening means thereon, said retainer being provided with a central opening adapted to pass the fastener shank; a toroidal shaped gasket of resilient rubber-like material disposed within said countersunk opening portion and surrounding the fastener shank, said gasket being deformed into sealing contact with the adjacent surfaces of said fastener shank, said countersunk opening portion, and the small end of said retainer upon tightening of said fastener.

References Cited in the file of this patent

UNITED STATES PATENTS

| | | |
|---|---|---|
| 2,448,031 | Johnson et al. | Aug. 31, 1948 |
| 2,517,012 | Miller | Aug. 1, 1950 |
| 2,611,285 | Gross | Sept. 23, 1952 |
| 2,884,098 | Hutchison | Apr. 28, 1959 |